United States Patent
Kaiser et al.

(10) Patent No.: US 9,546,687 B2
(45) Date of Patent: Jan. 17, 2017

(54) SEALING ARRANGEMENT FOR WHEEL BEARINGS HAVING A PRESTRESSED SPLASH PLATE

(71) Applicant: Schaeffler Technologies AG & Co. KG, Herzogenaurach (DE)

(72) Inventors: Andreas Kaiser, Werneck (DE); Roland Langer, Schwanfeld (DE); Frank Eichelmann, Hassfurt (DE); Tobias Bauer, Gochsheim (DE); Markus Reuter, Wurzburg (DE); Ralf Heiss, Schweinfurt (DE); Jonas Lang, Schwebheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/909,614

(22) PCT Filed: Jul. 8, 2014

(86) PCT No.: PCT/DE2014/200309
§ 371 (c)(1),
(2) Date: Feb. 2, 2016

(87) PCT Pub. No.: WO2015/039652
PCT Pub. Date: Mar. 26, 2015

(65) Prior Publication Data
US 2016/0178010 A1 Jun. 23, 2016

(30) Foreign Application Priority Data
Sep. 17, 2013 (DE) ........................ 10 2013 218 635

(51) Int. Cl.
*F16C 33/80* (2006.01)
*F16C 33/78* (2006.01)

(52) U.S. Cl.
CPC ....... *F16C 33/7896* (2013.01); *F16C 33/7823* (2013.01); *F16C 33/7826* (2013.01); *F16C 33/805* (2013.01)

(58) Field of Classification Search
CPC ...... F16J 15/32; F16J 15/3204; F16J 15/3232; F16J 15/3248; F16J 15/3252; F16J 15/3268; F16C 33/72; F16C 33/78; F16C 33/7816; F16C 33/7859
See application file for complete search history.

(56) References Cited

U.S. PATENT DOCUMENTS

2010/0129018 A1    5/2010  Shigeoka
2012/0313328 A1*  12/2012  Larson ................. F16J 15/3276
                                                          277/549
(Continued)

FOREIGN PATENT DOCUMENTS

DE    112008001394    4/2010
DE    102009052311    5/2011
(Continued)

*Primary Examiner* — Gilbert Lee
(74) *Attorney, Agent, or Firm* — Volpe and Koenig, P.C.

(57) ABSTRACT

A bearing seal (2) of a rolling bearing configured as a wheel bearing (1) that is connected between a first rotationally rigid bearing part (5) and a second bearing part (7) that is integral with a wheel bearing flange (8), between which rolling bodies (6) are guided. The bearing seal (2) includes a splash plate (3) configured as a preseal, which is supported on an axially and radially oriented contour (12) of the second bearing part (7), and together with the wheel bearing flange (8), axially defines a catch channel (24). A seal fitting (4) is fixed to the first bearing part (5) by a reinforcement (22), wherein the reinforcement (22) is enclosed by an elastic sealing material (21), at least in some areas, from which sealing lips (20, 28, 29) are formed, which are grindingly or non-grindingly associated with the splash plate (3). Between the splash plate (3), which abuts, in a line or surface contact, (Continued)

the radially oriented wheel bearing flange (8) via a support zone (10), and the sealing fitting (4), a sealing labyrinth (16) is provided. By way of a resiliently flexible fastening section (11), the splash plate (3) is pressed onto the cylindrical contour (12) of the second bearing part (7) and is prestressed in an end position.

9 Claims, 6 Drawing Sheets

(56) References Cited

U.S. PATENT DOCUMENTS

| | | | |
|---|---|---|---|
| 2013/0127119 A1 | 5/2013 | Haepp et al. | |
| 2016/0003302 A1* | 1/2016 | Seno .................... | F16J 15/3264 |
| | | | 277/351 |

FOREIGN PATENT DOCUMENTS

| | | |
|---|---|---|
| DE | 102010034385 | 2/2012 |
| DE | 102011088861 | 6/2013 |
| WO | 2012019803 | 2/2012 |

\* cited by examiner

SEALING ARRANGEMENT FOR WHEEL BEARINGS HAVING A PRESTRESSED SPLASH PLATE

BACKGROUND

The invention relates to a bearing seal of a roller bearing constructed as a wheel bearing between a first rotationally fixed bearing part and a second bearing part connected integrally with a wheel bearing flange, with roller bodies being guided between these bearing parts.

For achieving a long service life, wheel bearings of vehicles require two-sided seals for the interior space that is filled with lubricant and contains roller bodies. For this purpose, splash plates are used that form a sealing labyrinth with sealing lips.

From DE 10 2009 052 311 A1, a wheel bearing is known that encloses, on the flange side, a splash ring for sealing the roller bearing that has axial surfaces for the rubbing sealing contact with two axial sealing lips. Through the use of a hollow cylindrical fastening area, the splash plate is mounted on the wheel flange. JP 2003-56577 A discloses a seal for a wheel bearing in which the outer ring, as a first bearing part, is sealed relative to the wheel flange, as a second bearing part. The wheel bearing seal encloses a splash plate that contacts both axially and also radially on the wheel hub or wheel flange. In the installed state, axial sealing lips are supported by rubbing sealing contacts on the splash plate. The sealing lips are allocated to a carrier that is mounted on a radial inner side of the outer ring. In DE 2010 034 385 A1, a bearing seal for wheel bearings is shown in which a splash plate is fixed on a wheel bearing flange that is connected integrally with a rotating bearing ring of the wheel bearing. On the splash plate, sealing lips of a seal arrangement are supported that is coupled with the other rotationally fixed bearing ring.

SUMMARY

The objective of the invention is to create a splash plate that can be produced economically and for which an exact installation position is provided for achieving an improved sealing function and service life.

This objective is achieved by the features of the invention. Advantageous refinements of the invention are described below and in the claims The bearing seal for a wheel bearing according to the present invention comprises a preseal that is constructed integrally as a splash plate or splash disk and is installed pre-stressed and thus permanently fixed in position. The construction provides that the splash plate forms, on one hand, a linear or surface area contact via a support zone on the wheel bearing flange oriented in the radial direction. On the other hand, an inner, bending elastic fastening section of the splash plate is pressed onto the cylindrical contour of the hub of the second bearing part oriented in the axial direction and pre-stressed in an end position and secured with a non-positive and/or positive fit connection. According to the structural design according to the invention, the splash plate is supported pre-stressed in the axial direction and consequently on the end side on the wheel bearing flange oriented in the radial direction. Advantageously, an effective long-term installation position is set that simultaneously guarantees a constant sealing effect for achieving an improved service life of the wheel bearing.

The pre-stressed and secured installation position of the splash plate according to the invention advantageously compensates for further movements that are produced in the operating state between the hub and the wheel bearing flange due to circumferential bending loading or also due to thermally changing conditions. The invention successfully prevents, for example, loosening of the press fit and consequently a lifting or displacement of the splash plate and also compensates for production-dependent tolerances of the assembled or interacting parts. The exact, narrow tolerance position or installation position of the splash plate set by the invention also has advantageous effects on the elastic sealing lips of the seal fitting supported directly on the splash plate. Thus, for the seal and its sealing lips, a defined installation position can be defined in order to achieve an optimum with respect to good sealing characteristics and low wear and consequently high service life. Through the invention, a wheel bearing seal can be realized that protects the wheel bearing effectively from penetration of foreign particles from the surroundings and prevents the escape of lubricant out of the wheel bearing.

A preferred construction of the invention provides that the plate spring-like, pre-stressed splash plate has, in the area of the fastening section, a press-in surface designed for a mounting or installation tool. Advantageously, the press-in surface formed circumferentially or partially in the bending elastic fastening section is constructed as a bead, depression, or step. By use of the press-in surface, the splash plate can be held, for example, for automated mounting by a mounting tool and pressed onto the hub of the second bearing part until a secured bearing position is achieved in which, for example, the splash plate snaps onto the hub of the second bearing part with a positive fit.

According to a preferred structural construction of the invention, the splash plate locks or snaps into a radial recess or a step with a positive fit, in particular, in a circumferential ring groove of the cylindrical contour of the hub of the second bearing part. As an alternative it is provided to fix the splash plate in the axial direction on a ring element surrounding the hub or the second bearing part. Furthermore, according to the invention the splash plate can lock or clamp with the help of the spring effect (self-locking) on grooves or on an increased roughness of the surface of the cylindrical contour of the hub of the second bearing part. Through the radial prestress in connection with the surface roughness, a secure position of the splash plate can also be achieved in connection with the surface roughness. As a measure for simplifying the mounting, the axial pressing-on, the invention includes circumferential-side slots that are formed in the area of an edge zone of a central opening of the splash plate.

Furthermore, the splash plate is shaped according to the invention such that this runs at a distance relative to the second bearing part in the installation state between the support zone on the wheel bearing flange and the inner locking. The elastic connection section of the splash plate formed in this way defines a hollow space. For sealing a ring gap between the splash plate and the second bearing part, according to the invention, a sealing mass can be introduced into the hollow space, in particular, locally between the wheel bearing flange and the splash plate. As an alternative seal, a seal or sealing ring can be inserted into the hollow space for the ring gap seal. As a supplemental measure for long-term sealing of the ring gap between the splash plate and the radial flange it is provided to coat the support zone of the splash plate with an elastic or plastic sealing mass or to arrange a sealing lip on the support zone via a material-fit connection, in particular, through vulcanization. The seal simultaneously offers an effective protection against rotation of the splash plate relative to the second bearing part.

As the material for the splash plate according to the invention, preferably a metallic material, in particular, stainless steel, is suitable. As an alternative to a non-rusting material, for example, a steel plate can be used whose surfaces are treated or coated. Furthermore, a splash plate made of plastic could also be used.

Additional details and refinements of the invention are given from the following descriptions of the figures in which embodiments of the invention are shown. The shown embodiments show examples how the sealing arrangement according to the invention can be equipped. They do not represent a definitive definition of the invention. The invention is not restricted to the illustrated embodiments. Shown are:

DETAILED DESCRIPTION OF THE PREFERRED EMBODIMENTS

Figure 1:
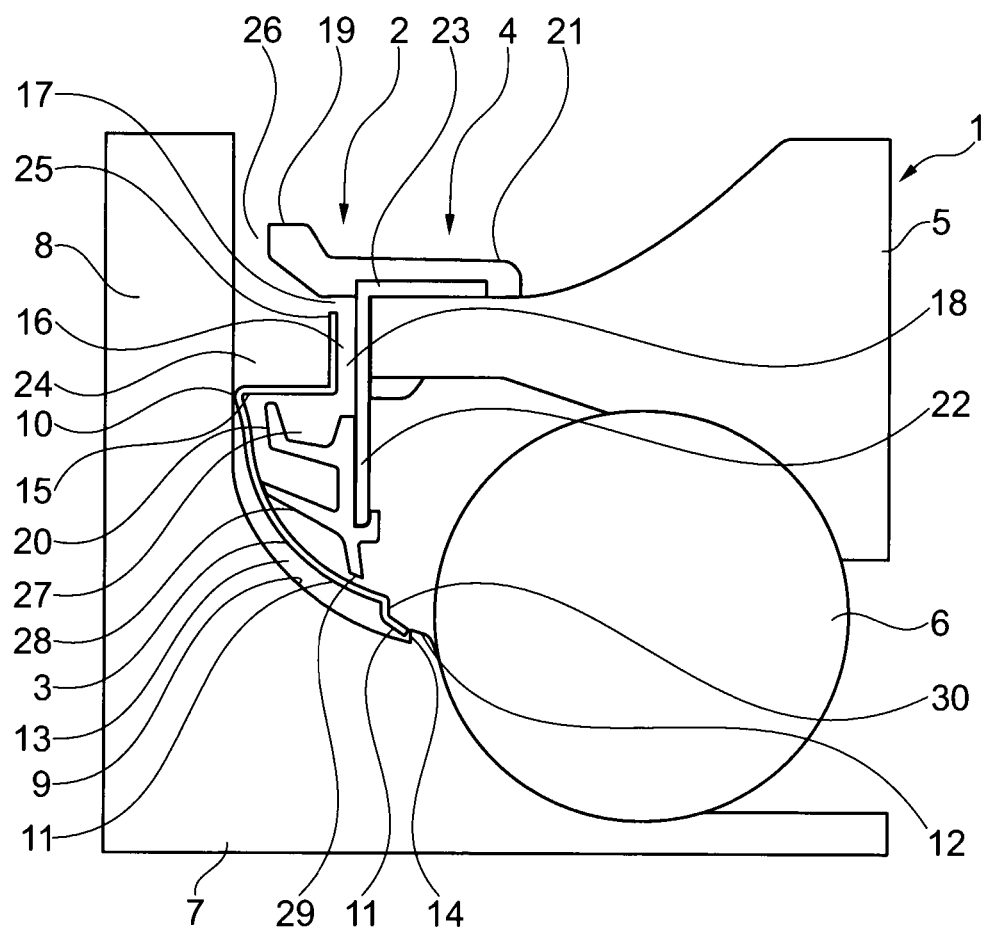
FIG. 1 a bearing seal for a wheel bearing that comprises a splash plate according to the invention, FIG. 2 a second embodiment of a splash plate according to the invention, FIG. 3 a third embodiment of a splash plate according to the invention, FIG. 4 a fourth embodiment of a splash plate according to the invention, FIG. 5 a fifth embodiment of a splash plate according to the invention, FIG. 6 a sixth embodiment of a splash plate according to the invention, FIG. 7 a seventh embodiment of a splash plate according to the invention, FIG. 8 an eighth embodiment of a splash plate according to the invention, FIG. 9 a ninth embodiment of a splash plate according to the invention, FIG. 10 a tenth embodiment of a splash plate according to the invention.

In FIG. 1, a cut-out of a wheel bearing 1 is shown that is designed for a vehicle (not shown). In detail, the construction of a wheel bearing seal 2 is shown that comprises a preseal formed as a splash plate 3 and a seal fitting 4. The wheel bearing 1 contains, as a first bearing part 5, an outer bearing ring that is stationary and connected, in the installation state, to a wheel carrier (not shown). Roller bodies 6 are guided on the outside on the bearing part 5 and on the inside on a second bearing part 7, an inner bearing ring that is connected integrally with a wheel bearing flange 8 oriented in the radial direction.

The splash plate 3 preferably produced from a metallic material is supported by a linear contact on one hand by a support zone 10 on a contour that is oriented in the radial direction, the wheel bearing flange 8, and by an inner bending elastic fastening section 11 on an essentially cylindrical contour 12 of the hub of the second bearing part 7. The splash plate 3 runs between these contact points at a distance to an inner radius 9 of the second bearing part 7 for forming a hollow space 13.

A defined pre-stressed installation position in achieved by locking the splash plate 3 on a step 14 formed in the second bearing part 7. For this purpose, the splash plate 3 is pressed onto the cylindrical contour 12. Starting from the support zone 10, the splash plate 3 forms an angled leg 15 at which a radial rim 25 connects on the end side. For realizing a sealing labyrinth 16, the rim 25 of the splash plate 3 engages in an axial receptacle 18 of the seal fitting 4 that is limited in the radial direction by a projection 19 and by a sealing lip 20 while maintaining a sealing gap 17. The projection 19 and a sealing lip 20 are formed from a matching elastic sealing material 21, for example, an elastomer that covers or at least borders a reinforcement 22 of the seal fitting 4. For fixing the reinforcement 22 and consequently the seal fitting 4, an angled section 23 of the reinforcement 22 encloses an outer contour of the first bearing part 5.

A catch channel 24 that is open on the outside and is designed for holding foreign particles in the splash plate 3 is bordered in the axial direction by the rim 25 and the wheel bearing flange 8. The projection 19 bent at a right angle on the end side covers the opening of the collection channel 24 of the splash plate 3 to a large degree and is guided on the wheel bearing flange 8 up to a ring gap 26. The sealing lip 20 forms a collection channel 27 that is connected after the catch channel 24 of the splash plate 3 and is locked in rotation in contrast to the catch channel 24 that rotates in the operating state. A liquid coming into the collection channel 27 reaches unimpeded the lowest zone of the collection channel 27 in the vertical direction due to gravity and then the inside of the splash plate 3. When the vehicle stops or caused by centrifugal force in the driving state by the rotating splash plate 3, the liquid is fed outward in the radial direction via the sealing gap 17 for discharge from the wheel bearing seal 2. The sealing lip 20 forms the first of a total of three elastic sealing lips of a sealing lip arrangement of the seal fitting 4 that are formed from a matching sealing material 21. The middle sealing lip 28 forms a rubbing contact support on the splash plate 3. The other, non-rubbing sealing lip 29 is oriented inward in the radial direction relative to the splash plate 3. In summary, the invention relates to a wheel bearing seal 2 in which both water and also foreign particles are deflected in the radial direction to a large extent by the splash plate 3 in driving operation and are thus kept away from the sealing gap 17 of the sealing labyrinth 16.

FIGS. 2 to 10 show alternative embodiments of splash plates 3a to 3i according to the invention for a wheel bearing seal 2, wherein, for matching components, identical reference symbols are used. The following descriptions are essentially limited to splash plates with different constructed relative to the embodiment of FIG. 1.

Figure 2:
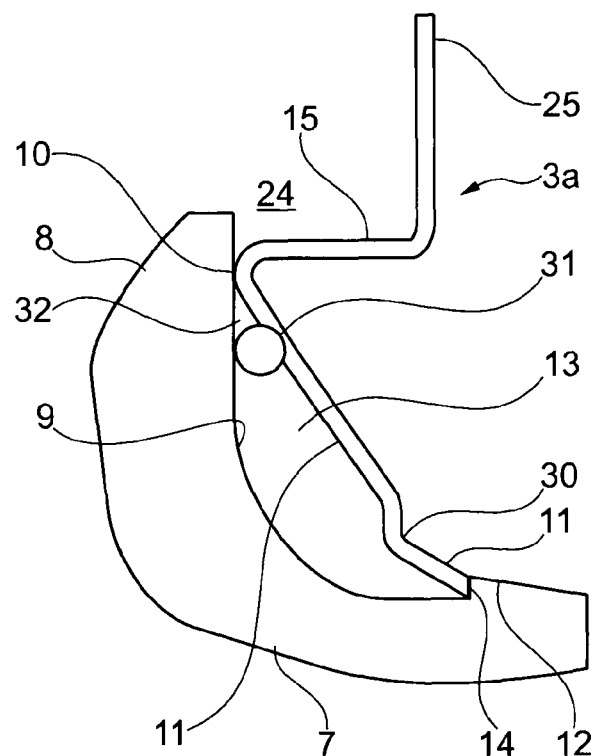

FIG. 2 shows the splash plate 3a in the installed state that forms a linear contact over the support zone 10 on the wheel bearing flange 8. On the inside, the splash plate 3a is snapped onto the step 14 of the cylindrical contour 12 of the second bearing part 7, wherein the splash plate 3a is positioned pre-stressed. As a measure for simplifying assembly it is provided to form slots (not shown) distributed around the circumference in the fastening section 11. A press-in surface 30 formed as an offset on the splash plate 3a is designed for engagement of a mounting tool (not shown). Close to the support zone 10 there is, within the hollow space 13, a sealing mass 31 for sealing a ring gap 32 between the wheel bearing flange 8 and the splash plate 3a.

Figure 3:
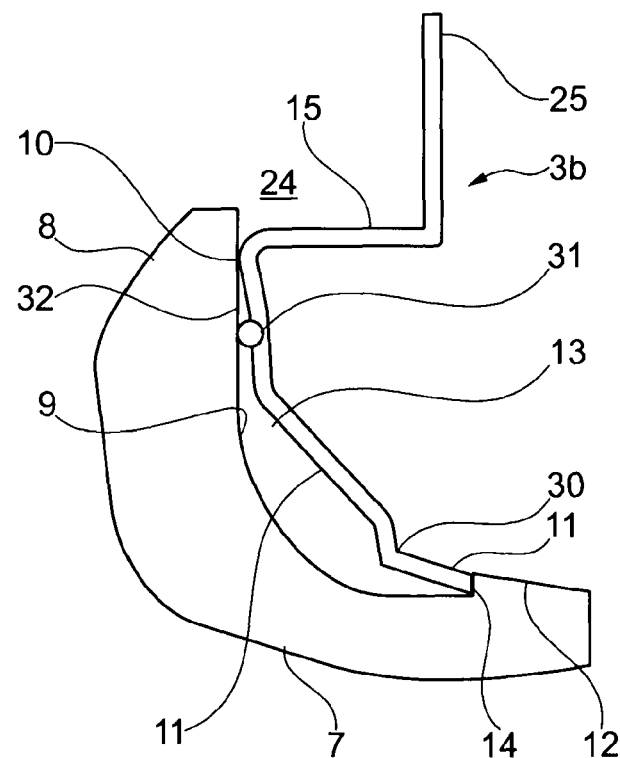
Figure 4:
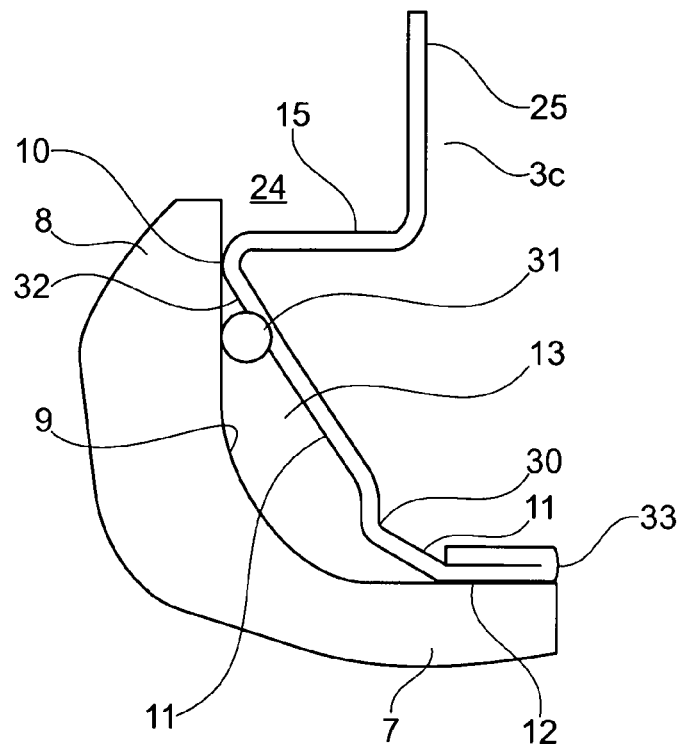
Figure 5:
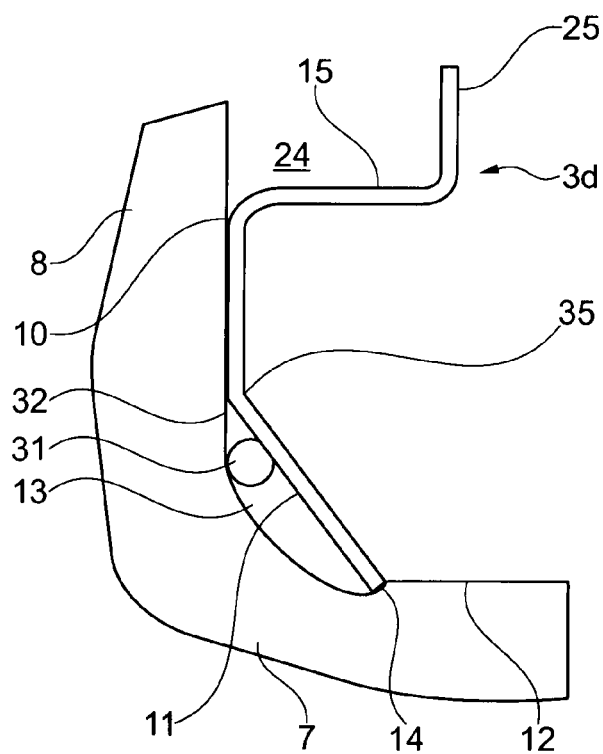
Figure 6:
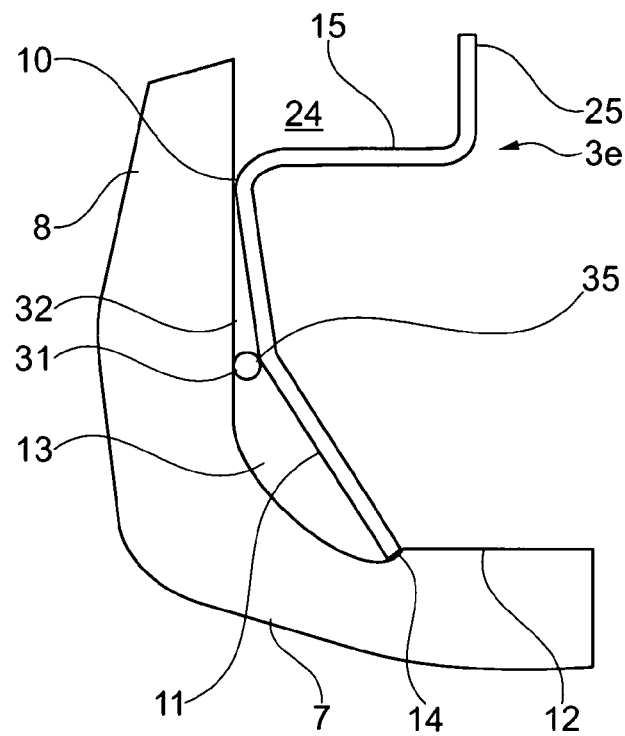
Figure 7:
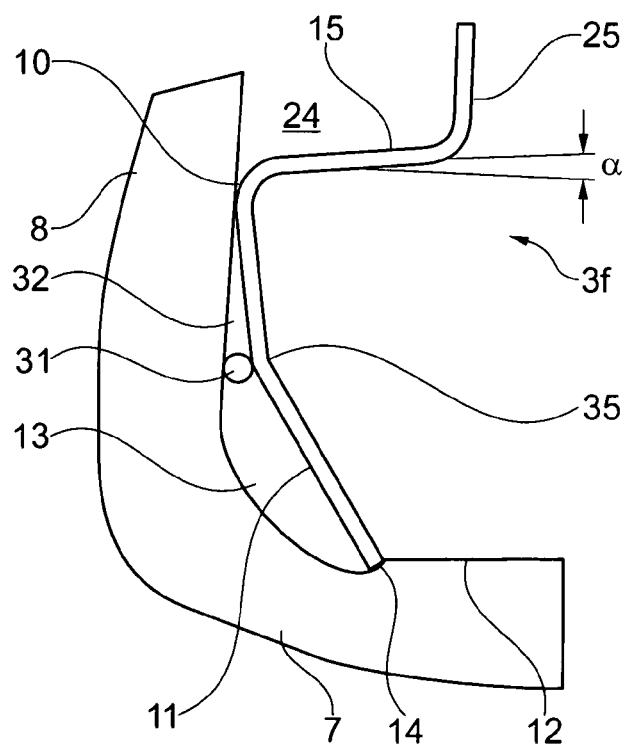

In FIG. 3, the installed splash plate 3b is shown that has a flat support zone 10 deviating from the splash plate 3a, wherein the sealing mass 31 is inserted in the area of the support zone 10. FIG. 4 shows the splash plate 3c that locks, in contrast to FIG. 2, on a separate ring element 33 surrounding the cylindrical contour 12 of the second bearing part 7. The splash plate 3d according to FIG. 5 is connected directly to the wheel bearing flange 8 by a relatively large surface area support zone 10. The sealing mass 31 for sealing the ring gap 32 is inserted adjacent to the support zone 10 within the hollow space 13. A fastening section 11 that is formed in a straight line and locks on the step 14 on the end side is adjacent to the support zone 10 of the splash plate 3d. A press-in surface 34 designed for the mounting tool is provided above that of the splash plate 3d.

Figure 8:
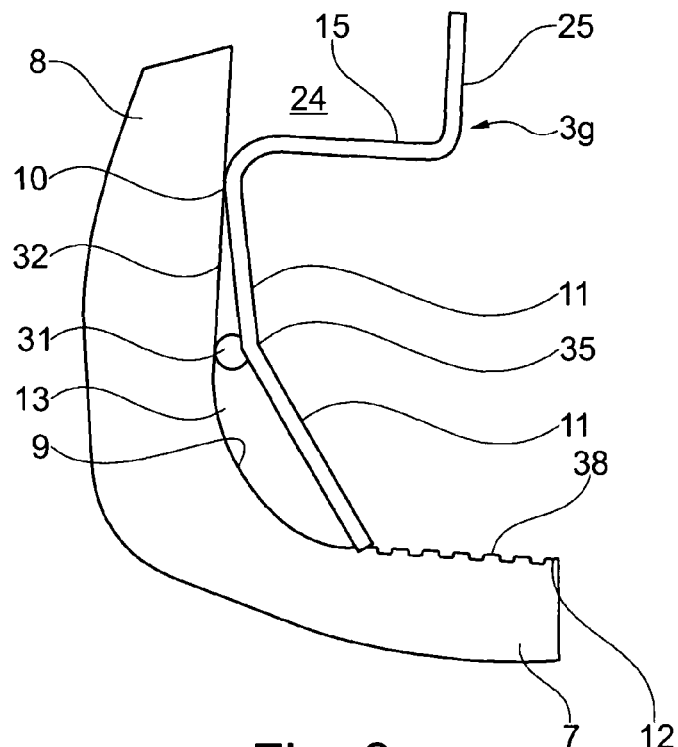
Figure 9:
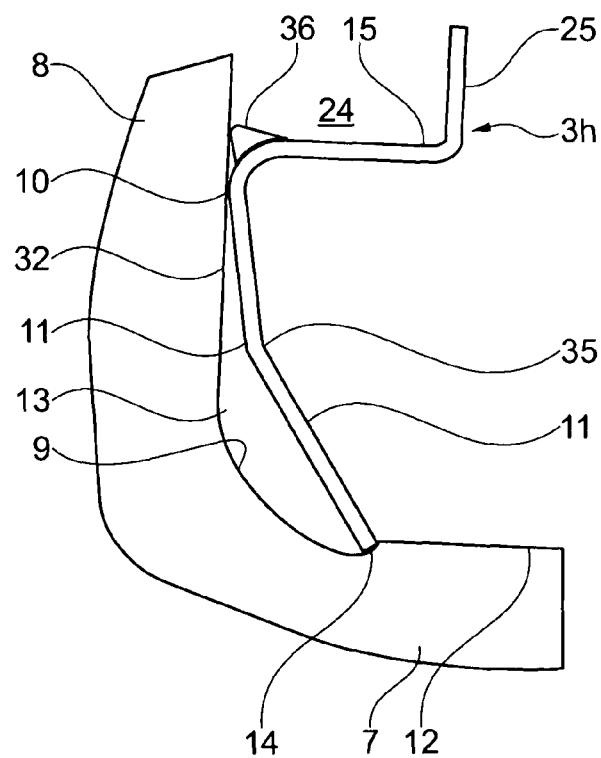

In FIGS. 6 to 10, the splash plates 3e to 3i are shown, which are supported forming a matching linear contact on the wheel bearing flange 8. Between the support zone 10 and the lock on the step 14, the splash plates 3e to 3i have a press-in surface 35 in the area of a bending zone. According to FIGS. 6 to 8, the sealing mass 31 for sealing the ring gap 32 is inserted within the hollow space 13 opposite the press-in surface 35. Alternatively, FIG. 9 shows the splash plate 3h that encloses, in the area of the support zone 10, a sealing lip 36 that is preferably vulcanized in place to seal the ring gap 32.

Figure 10:
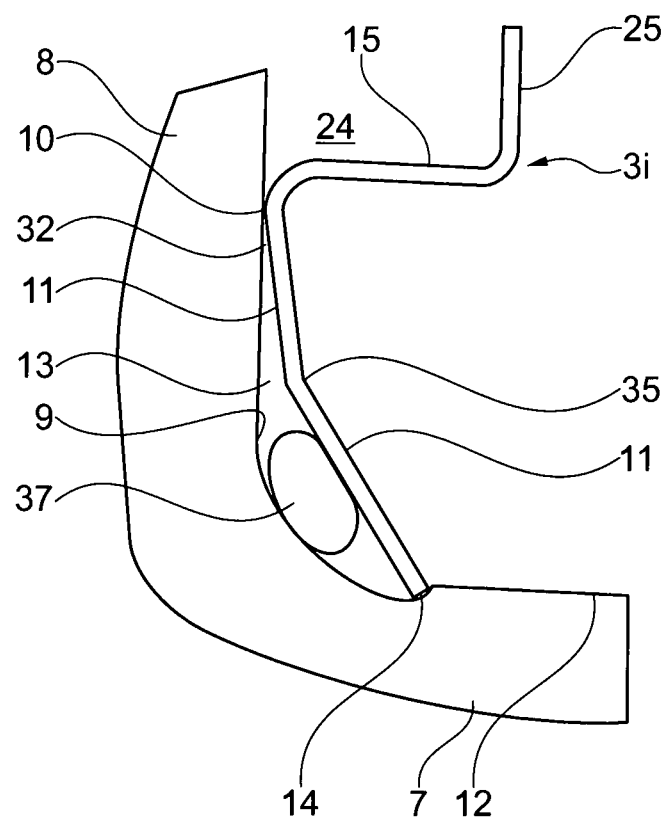

According to FIG. 10, a seal 37 formed as a sealing ring, in particular, an O-ring, is provided in the hollow space 13 for sealing the ring gap 32 between the wheel bearing flange 8 and the splash plate 3i. The splash plate 3f according to FIG. 7 differs from all of the other splash plates by a leg 15 that is oriented rising at an angle α instead of a right-angle leg. The leg 15 set at an angle promotes the discharge of liquid if it comes into the wheel bearing seal 2. In FIG. 8, the splash plate 3g is shown in whose cylindrical contour 12 of the hub of the second bearing part 7, advantageously circumferential grooves 38 are formed that are designed for locking the splash plate 3g. Fixing the splash plate 3g can be realized as an alternative to the grooves 38 by a targeted increased roughness of the cylindrical contour 12.

LIST OF REFERENCE NUMBERS

1 Wheel bearing
2 Wheel bearing seal
3 Splash plate
3a-3i Splash plate
4 Seal fitting
5 Bearing part (first)
6 Roller body
7 Bearing part (second)
8 Wheel bearing flange
9 Inner radius
10 Support zone
11 Fastening section
12 Contour
13 Hollow space
14 Step
15 Leg
16 Sealing labyrinth
17 Sealing gap
18 Receptacle
19 Projection
20 Sealing lip
21 Sealing material
22 Reinforcement
23 Section
24 Catch channel
25 Rim
26 Ring gap
27 Collection channel
28 Sealing lip
29 Sealing lip
30 Press-in surface
31 Sealing mass
32 Ring gap
33 Ring element
34 Press-in surface
35 Press-in surface
36 Sealing lip
37 Seal
38 Grooves

The invention claimed is:

1. A bearing seal arrangement of a roller bearing constructed as a wheel bearing the bearing arrangement comprising a first rotationally fixed bearing part and a second bearing part connected integrally to a wheel bearing flange, with roller bodies being guided between said bearing parts, and a bearing seal comprising:
a splash plate constructed as a preseal and supported on a contour of the second bearing part that is oriented in axial and radial directions and defines, together with the wheel bearing flange, a catch channel in the axial direction,
a seal fitting fixed by a reinforcement on the first bearing part, the reinforcement is enclosed at least in some areas by an elastic sealing material from which at least two sealing lips are formed that form a rubbing or non-rubbing seal with the splash plate,
a seal labyrinth set between the splash plate and the seal fitting,
the splash plate forms a linear or surface area contact on the wheel bearing flange oriented in the radial direction over a support zone and a bending elastic fastening section of the splash plate is pressed onto a cylindrical contour of the second bearing part and is secured pre-stressed with a non-positive or positive fit connection in an end position, wherein the splash plate is pre-stressed in the radial direction and forms a plate spring that has a press-in surface extending in a generally radial direction directly adjacent to the fastening section that is adapted for a mounting tool.

2. The bearing seal arrangement according to claim 1, wherein for axial securing, the splash plate locks on a step in a radial recess or in a circumferential groove of the cylindrical contour in a hub of the second bearing part.

3. The bearing seal arrangement according to claim 1, wherein a hub of the second bearing part includes a plurality of circumferential grooves axially spaced apart from each other, and for the axial securing, the splash plate is fixed in position in one of the plurality of grooves.

4. The bearing seal arrangement according to claim 1, wherein slots limited in length on a circumferential side are formed on an inside in the splash plate.

5. The bearing seal arrangement according to claim 1, wherein in an installed state, the splash plate extends between a first contact point defined at the support zone engaging the second bearing part and a second contact point defined at the bending elastic fastening section engaging the cylindrical contour at a distance to the second bearing part that defines a hollow space extending uninterrupted between the first contact point and the second contact point.

6. The bearing seal arrangement according to claim 5, wherein a sealing mass or a seal is inserted in the hollow space for sealing a ring gap between the splash plate and the second bearing part and also for rotational securing of the splash plate.

7. The bearing seal arrangement according to claim 1, wherein the splash plate has, in the area of the support zone, a sealing lip or an elastic sealing mass.

8. The bearing seal arrangement according to claim 1, wherein the splash plate is made from a metallic material.

9. The bearing seal arrangement according to claim 1, wherein for the axial securing, the splash plate is fixed in position on a surface roughness of the cylindrical contour of a hub of the second bearing part.

* * * * *